Patented Apr. 15, 1952

2,593,236

UNITED STATES PATENT OFFICE 2,593,236

ADHESIVE COMPOSITION COMPRISING A VINYLIDENE CHLORIDE - ACRYLONITRILE COPOLYMER LATEX AND A PROTEIN

Arthur E. Young, Elmer K. Stilbert, and Robert H. Lalk, Midland, Mich., assignors to The Dow Chemical Company, Midland, Mich., a corporation of Delaware No Drawing. Application March 22, 1950, Serial No. 151,304

7 Claims. (Cl. 260—8)

This invention relates to novel adhesive compositions and particularly to such compositions useful in the bookbinding art.

In the past, woven or non-woven fibrous bases coated with cellulose derivative compositions have been used extensively in edge binding pads of cut sheets of paper. More recently various synthetic resins have been used in bookbinding compositions because of certain desirable properties, for example, they are easily worked into the composition and in general form binding films that withstand hard usage. They have proved very effective in the so-called "Perfect" binding, which is widely used in the making of telephone directories, for example. In the "Perfect" binding process, no sewing or staples are used to aid in holding cut sheets of paper together. They are held in place solely with a tough, synthetic film-forming adhesive. This type of adhesive is very effective in holding together cut sheets of paper that are of the absorbent and rough grade. However, it has been very unsatisfactory for binding together cut sheets of paper that are hard surfaced such as those that are filled and coated.

An object of the invention is to provide an adhesive composition, suitable for use in the "Perfect" binding process, which will adhere to very smooth, hard surfaced papers such as those that are filled and coated.

In accordance with the present invention, it has been found that latex compositions, to be described more fully, below, comprising a copolymer of 82 to 88 per cent vinylidene chloride and correspondingly 18 to 12 per cent acrylonitrile, and compatible protein modifiers form improved films which adhere exceptionally well to smooth, hard, non-porous surfaces. The modified latex composition of the present invention is suitable for practically all industrial purposes, including bookbinding and tabbing. It is also useful in fields where it is necessary to cause a substance or substances to adhere to surfaces that are not permeable to ordinary aqueous adhesives. The said composition is of medium body, somewhat tacky, and may dry and set quite rapidly. When dry, it forms an adhesive film that is very strong and flexible. Furthermore, it will not spoil, break down or acquire any disagreeable odor, although a very long period may elapse between its preparation and use.

In practice, the latex of a copolymer containing about 85 per cent of vinylidene chloride and about 15 per cent by weight of acrylonitrile is obtained by polymerizing a mixture consisting of 68 parts by weight of vinylidene chloride, 12 parts of acrylonitrile, and usually about 15 parts of dibutyl phthalate or other plasticizer in aqueous emulsion by known procedure. The polymerization is usually carried out by heating the aqueous emulsion of said mixture at temperatures between 40° and 55° C. with agitation, there being about 0.8 to 1.2 parts by weight of water for each part of the dispersed phase. The emulsion formed is allowed to stand for about 18 to 28 hours by which time copolymerization is complete, and a latex of about 45 to 55 per cent solids is formed. Usually, a latex of about 52 per cent solids is preferred in the present compositions.

The above-mentioned latex is mixed with a protein selected from the group consisting of casein, animal glue, isolated soya protein, and zein (the maize protein). The protein modifier is usually employed in an amount of about 5 to 20 per cent by weight based on the latex solids used. The latex is compatible with aqueous dispersions of the protein modifier prepared with the usual cutting agents such as sodium hydroxide, borax, trisodium phosphate, sodium silicate, sodium carbonate, sodium bicarbonate, mixtures of borax and sodium carbonate, and mixtures of borax, sodium carbonate, and thiourea. Aqueous dispersions of the protein modifier employed may range from 5 to 50 per cent by weight of the protein employed. A sufficient quantity of the above-defined alkaline cutting agent or agents is added to the protein in water so that swelling and dispersion of the protein may take place. Heating this mixture at a temperature between 50° and 100° C. for a short time usually aids in the dispersion of the protein in water. The aqueous dispersion of protein is then stirred into the latex. If the viscosity of the composition is too low for convenient use in the described method, it may be increased by the addition of such conventional thickeners as methyl cellulose.

If desired, the composition of the present invention may be further modified by the addition of an agent to control the drying rate of the resulting adhesive film. Commercially, a solution of calcium acetate is usually employed for this purpose. In most cases, it has proven to be quite satisfactory. However, it has been found that the composition of our invention is much improved by the addition of a wetting agent. An especially useful agent has been found to be that which is known as Triton X-100 and which is referred to by the manufacturer as an "alkyl aryl polyether alcohol," and believed to be the monoether of an alkyl phenol and a high molecular weight polyethylene glycol. This substance has given improved drying characteristics to the adhesive film and has increased the tensile strength of the adhesive bond on smooth paper by as much as 35 to 40 per cent over that obtained by the addition of calcium acetate to said latex. Generally, it has been found that the addition of about 3 per cent by weight of Triton X-100 to the composition is adequate to produce improved results in the resulting adhesive bond, but more or less of the wetting agent may be added with good results.

The following examples illustrate the practice of the invention, but are not to be construed as limiting the scope thereof. All of the following compositions are based on a latex of 52 per cent copolymer concentration prepared as described herein.

*Example I*

A 10 per cent solution of casein was prepared by heating, at 60° C. for one-half hour, a dispersion of 100 grams of casein in 500 grams of water with a mixture containing 10 grams of borax, 5 grams of sodium carbonate, 2.5 grams of a 28 per cent solution of ammonium hydroxide and 383 grams of water. 50 grams of the 10 per cent casein solution was stirred with 85.5 grams of the previously-defined latex and 1.5 grams of Triton X-100 (an alkyl aryl polyether alcohol) as a 25 per cent solution. The resulting composition was applied with a brush to an edge of a pad of hard sized, highly filled "ditto" grade of paper in a continuous coating of film. The pad of paper was tightly clamped between two ½" boards. The film of latex on the edge of the pad was dried by radiant heat for a period of 1 to 5 minutes. The pad was then exposed to a constant temperature of 75° F. and a relative humidity of 50 per cent for one week. Subsequently, the bond strength of the dried film was tested on a Scott tensile tester (IP4) similar to the apparatus described on page 900 of A. S. T. M. Standards, part III B (1946) for testing the tensile properties of plastics. First, five outside sheets of the pad were removed by hand. A pull of 8.2 pounds was then determined as that necessary to remove the top sheet when it was in one clamp and the rest of the pad in another clamp of the testing machine.

*Example II*

A 15 per cent solution of isolated soya protein was prepared by heating at 60° C. for 15 to 30 minutes a dispersion of 150 grams of isolated soya protein in 715 grams of water with 6.75 grams of sodium hydroxide in 135 grams of water. 34.7 grams of the 15 per cent isolated soya protein solution was stirred with 85.5 grams of said latex and 6 grams of a 25 per cent solution of Triton X-100. The resulting composition was applied with a brush to an edge of a pad of clay coated both sides paper in a continuous coating of film. The same testing procedure was carried out as in Example I, and a pull of 7.7 pounds was recorded in this case.

*Example III*

A 33 per cent solution of an animal hide glue was prepared by heating at 70° C. for about 30 minutes a dispersion of 50 grams of animal hide glue in 100 grams of water with 2.5 grams of borax. 16.5 grams of the 33 per cent solution of animal hide glue was stirred with 85.5 grams of said latex and 6 grams of a 25 per cent solution of Triton X-100. The resulting composition was applied with a brush to an edge of a pad of hard sized, highly filled "ditto" grade of paper in a continuous coating of film. The same testing procedure was carried out as in Examples I and II, and a pull of 7.2 pounds was recorded in this case.

*Example IV*

85.5 grams of said latex was stirred with 6 grams of a 25 per cent solution of Triton X-100. The resulting composition was applied with a brush to an edge of a pad of hard sized, highly filled "ditto" grade of paper in a continuous coating of film. The same testing procedure was carried out as in the three previous examples, and a pull of 5.95 pounds was recorded in this case.

*Example V*

In order to contrast the coatings of the present invention with those in which only the conventional calcium acetate drier is used, 85.5 grams of said latex was stirred with about 5 to 8 grams of a 10 per cent calcium acetate solution prepared by dissolving about 0.5 to 0.75 gram of calcium acetate in about 4.5 to 7.0 grams of water. The resulting composition was applied with a brush to an edge of a pad of hard sized, highly filled "ditto" grade of paper in a continuous coating of film. The same testing procedure was carried out as in the four preceding examples, and a pull of only 3.7 pounds was recorded in this case.

The improvement in bond strength of the adhesive film of said latex to an edge of smooth, filled, and hard surfaced paper has been demonstrated, in the above examples, by the incorporation of about 10 per cent of a protein, based on the weight of solids in said latex and by the coincident use of about 3 per cent of a wetting agent in said latex. A film deposited by a mixture of said latex and wetting agent (Example IV) had a bond strength improvement of about 38 per cent over that obtained by a mixture of said latex and calcium acetate (Example V). The film deposited by a mixture of said latex, wetting agent, and animal hide glue (Example III) had a bond strength improvement of about 16 per cent over that obtained by a mixture of said latex and wetting agent (Example IV). Moreover, the film deposited by a mixture of said latex, wetting agent, and isolated soya protein (Example II) had a bond strength improvement of about 23 per cent over that obtained by a mixture of said latex and wetting agent (Example IV). Furthermore, the film deposited by a mixture of said latex, wetting agent, and casein (Example I) had a bond strength improvement of about 27 per cent over that obtained by a mixture of said latex and wetting agent (Example IV). If a film deposited by a mixture of said latex, wetting agent, and zein be used in similar proportions as in the previous modified protein films, a comparable bond strength improvement is obtained.

We claim:

1. An adhesive composition comprising a copolymer of 82 to 88 per cent vinylidene chloride and correspondingly 18 to 12 per cent acrylonitrile, by weight, in the form of a latex of 45 to 55 per cent solids, by weight, and a protein modifier in the amount of from 5 to 20 per cent, by weight, based on latex solids, and selected from the group consisting of casein, isolated soya protein, animal hide glue, and zein.

2. The composition claimed in claim 1 wherein the latex has a solids content of about 52 per cent.

3. The composition claimed in claim 1 wherein the amount of protein present is 10 per cent of the weight of the latex solids.

4. The composition claimed in claim 1 wherein the protein modifier is casein.

5. The composition claimed in claim 1 wherein the protein modifier is isolated soya protein.

6. The composition claimed in claim 1 wherein the protein modifier is animal hide glue.

7. The composition claimed in claim 1 wherein the protein modifier is zein.

ARTHUR E. YOUNG.
ELMER K. STILBERT.
ROBERT H. LALK.

REFERENCES CITED

The following references are of record in the file of this patent:

Chicago Paint and Varnish Production Club, Paint Oil and Chemical Review, November 13, 1947, pp. 41, 42, 44, 45 and 48.

Dow advertisement, Chemical and Engineering News, vol. 25, No. 12, March 24, 1947, page 824.